United States Patent
Lee et al.

(10) Patent No.: US 7,733,585 B2
(45) Date of Patent: Jun. 8, 2010

(54) LENS DEVICE FOR IMAGE MAGNIFICATION

(75) Inventors: Yen-Chieh Lee, Dashu Township (TW); Yu-Jen Chen, Dashu Township (TW); Hsiu-Yen Tsai, Dashu Township (TW); Robin Shih, Dashu Township (TW)

(73) Assignee: I Shou University, Dashu Township (TW)

( * ) Notice: Subject to any disclaimer, the term of this patent is extended or adjusted under 35 U.S.C. 154(b) by 67 days.

(21) Appl. No.: 12/268,824

(22) Filed: Nov. 11, 2008

(65) Prior Publication Data

US 2009/0290238 A1    Nov. 26, 2009

(30) Foreign Application Priority Data

May 20, 2008    (TW) .............................. 97118482 A

(51) Int. Cl.
G02B 27/02    (2006.01)
G02B 7/02    (2006.01)
(52) U.S. Cl. ...................................... 359/802; 359/819
(58) Field of Classification Search ................. 359/694, 359/704, 802–815, 819–824
See application file for complete search history.

(56) References Cited

U.S. PATENT DOCUMENTS 5,912,774 A * 6/1999 Yoshida et al. .............. 359/823
7,623,308 B2 * 11/2009 Masuzawa ................... 359/819

* cited by examiner

*Primary Examiner*—Mohammed Hasan
(74) *Attorney, Agent, or Firm*—Townsend and Townsend and Crew, LLP

(57) ABSTRACT

A lens device includes a control unit, an objective lens, an image sensor, a light source, a detecting unit, and a tube assembly. The tube assembly includes a guide barrel, an outer tube, and a lens holder. The guide barrel is disposed on the control unit. The outer tube includes a tube body that is rotatably sleeve don the guide barrel, and a guiding portion. The lens holder includes a holder body having a set of projections driven by the guiding portion. The image sensor is electrically coupled to the control unit. The objective lens is optically aligned with the image sensor. The light source is coupled electrically to the control unit. The detecting unit generates a detector output indicating angular orientation of the outer tube. The control unit is responsive to the detector output to control intensity of light outputted by the light source.

7 Claims, 6 Drawing Sheets

US 7,733,585 B2

LENS DEVICE FOR IMAGE MAGNIFICATION

CROSS-REFERENCE TO RELATED APPLICATION

This application claims priority of Taiwanese Application No. 097118482, filed on May 20, 2008.

BACKGROUND OF THE INVENTION

1. Field of the Invention

The invention relates to a lens device, more particularly to a lens device for image magnification of a specimen.

2. Description of the Related Art

Due to sophistication in technology advancement, many counterfeits, such as paper money, checks, etc., are forged to such a fine precision that makes them difficult to be readily detected as a forgery. If, without any proper countermeasure, these counterfeits can be unnoticeably circulated in a market, they can create considerable losses for both consumers and merchants.

U.S. Pat. No. 7,102,817 entitled "Objective Lens Device for a Microscope" discloses a lens device that can be used to inspect suspected counterfeits. Referring to FIGS. 1 and 2, the conventional lens device includes a casing 10, a telescopic tube assembly 11, and a cap 12. The telescopic tube assembly 11 has an outer tube 111 that is sleeved rotatably in the casing 10, an inner tube 112 mounted in and coupled threadedly to the outer tube 111, and movable in a longitudinal direction of the outer tube 111, and an objective lens 113 mounted in the inner tube 112 and through which a specimen 100 can be observed. The cap 12 is disposed on the casing 10 and includes an image sensor 121 for capturing images of the specimen 100 from the objective lens 113, and a pair of spaced-apart guiding rods 122 that extend through the inner tube 112.

When adjusting a focal length between the objective lens 113 and the specimen 100, the outer tube 111 is rotated, and the inner tube 112 moves longitudinally in the outer tube 111 under the guidance of the guiding rods 122.

The image sensor 121 is electrically coupled to an external image viewer (i.e., a computer). However, in the above-described arrangement, the lens device is not provided with any light source for illumination of the specimen 100. Light plays an important role for obtaining a better image of the specimen 100. As an example, if there is inadequate illumination during high-power magnification of the specimen 100, the image quality of the specimen 100 will be poor. As a result f this drawback, the lens device is unsuited for applications requiring a higher magnification power.

Reference is now made to FIGS. 3 and 4. There exists another lens device 2 that alleviates the aforementioned problems by incorporating a light emitting unit 211. lighting problems.

A general principle for obtaining an optimal image quality of the specimen 100 is to calibrate the lens device 2 with a proper light balance. That is, different magnification powers require different intensities of the light outputted by the light emitting unit 211. However, the intensity of the light provided by this lens device 2 is non-adjustable, and hence the lens device 2 is incapable of acquiring an optimal image quality of the specimen 100 for a wide range of magnification power.

SUMMARY OF THE INVENTION

Therefore, the object of the present invention is to provide a lens device capable of overcoming the above-mentioned drawbacks of the prior art.

According to the invention, a lens device is for image magnification of a specimen, and includes a control unit, a detecting unit, an objective lens, an image sensor, a light source, and a tube assembly.

The control unit includes a main circuit board. The tube assembly includes a guide barrel, an outer tube, and a lens holder. The guide barrel is disposed on the main circuit board, that confines a barrel hole that extends along a barrel axis, and is formed with a set of slots that extend parallel to the barrel axis. The outer tube includes a tube body that is rotatably sleeved on the guide barrel and that has an inner tube surface, and a guiding portion that is formed on the inner tube surface of the tube body. The lens holder includes a holder body that is disposed movably in the barrel hole of the guide barrel and that has a set of projections that extend through the slots to engage the guiding portion. The image sensor is disposed on and is electrically coupled to the main circuit board. The image sensor is disposed in the guide barrel. The objective lens is mounted to the lens holder and is optically aligned with the image sensor. The light source is coupled electrically to the main circuit board and is operable to output light for illumination. The detecting unit is coupled to the main circuit board and generates a detector output indicating angular orientation of the outer tube relative to the main circuit board. Rotation of the outer tube relative to the guide barrel results in the guiding portion driving the projections to result in movement of the lens holder in the guide barrel along the barrel axis. The control unit is responsive to the detector output to control intensity of the light outputted by the light source according to the angular orientation of the outer tube.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
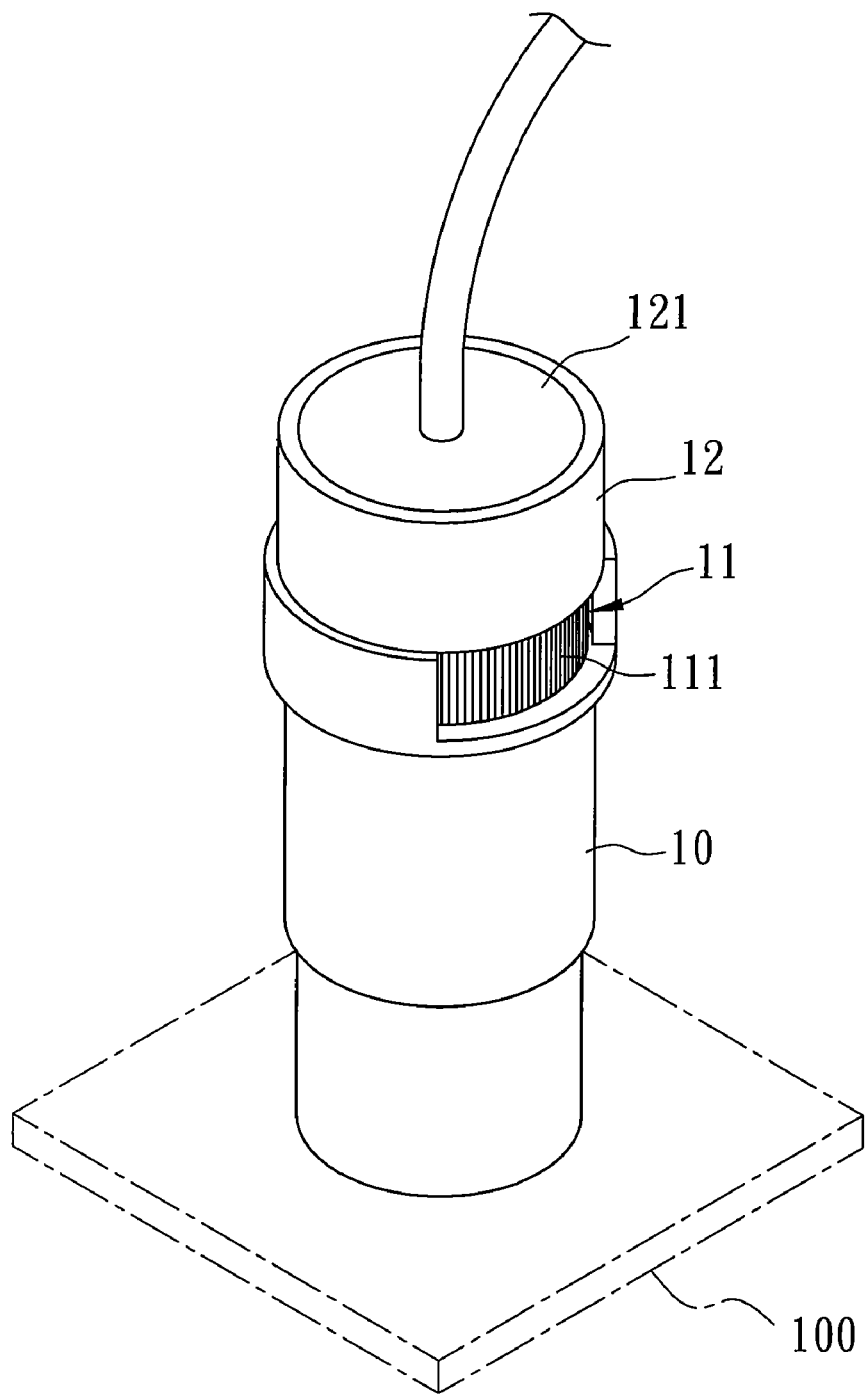
FIG. 1 is a perspective view of a conventional lens device.
Figure 2:
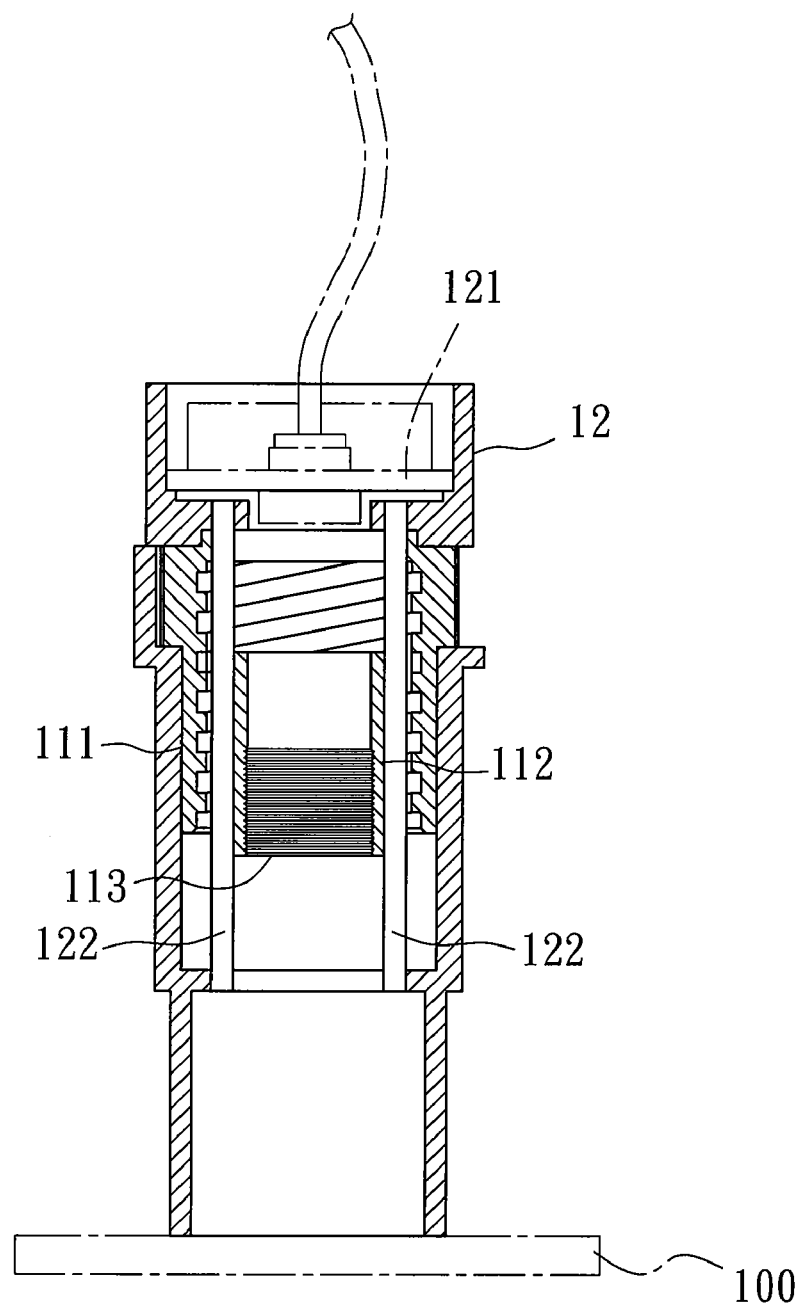
FIG. 2 is a sectional view of the conventional lens device shown in FIG. 1.
Figure 3:
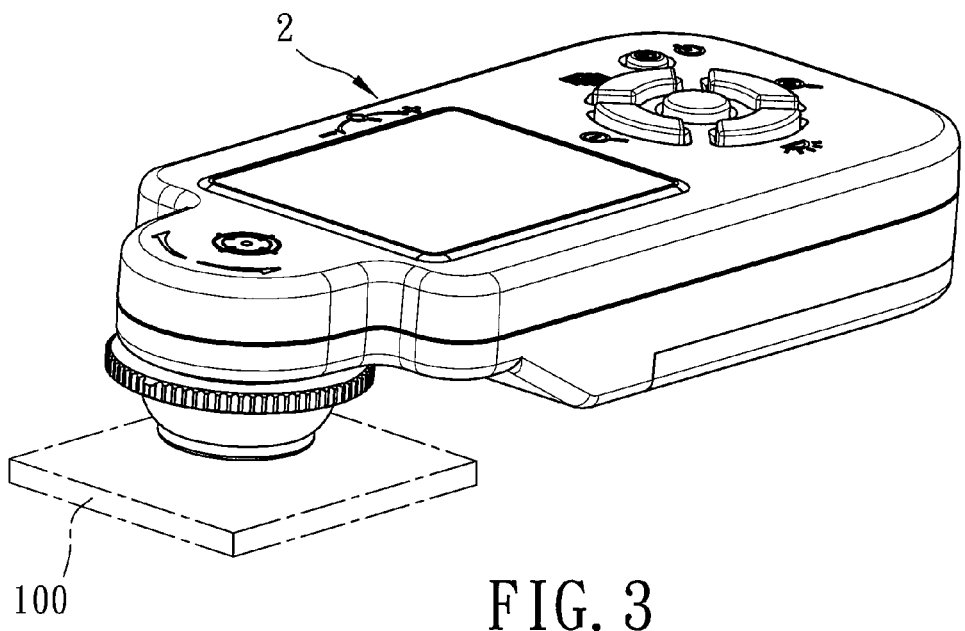
FIG. 3 is a schematic view to illustrate another conventional lens device.
Figure 4:
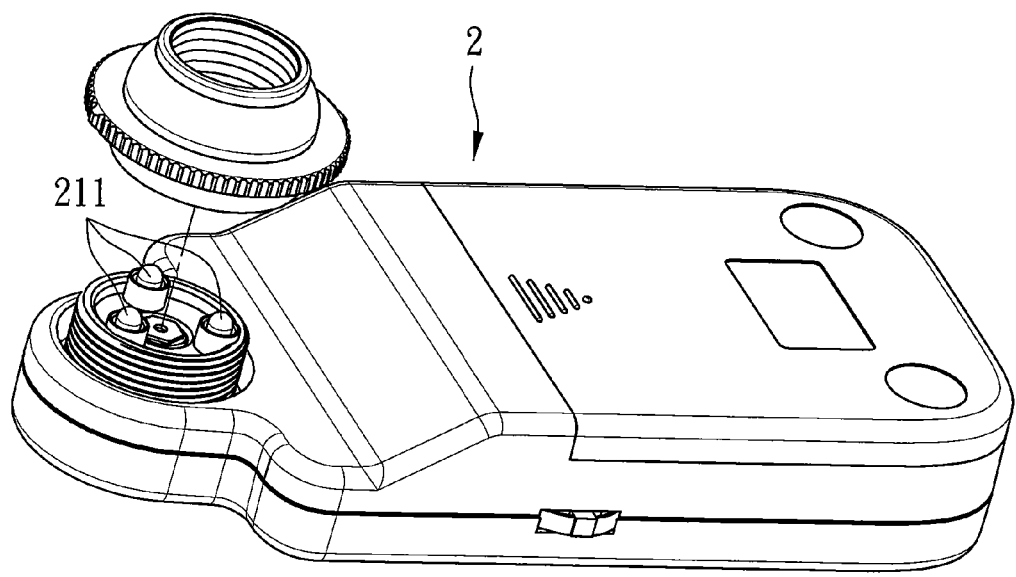
FIG. 4 is a partly exploded perspective view to illustrate a light emitting unit installed in the conventional lens device of FIG. 3.
Figure 5:
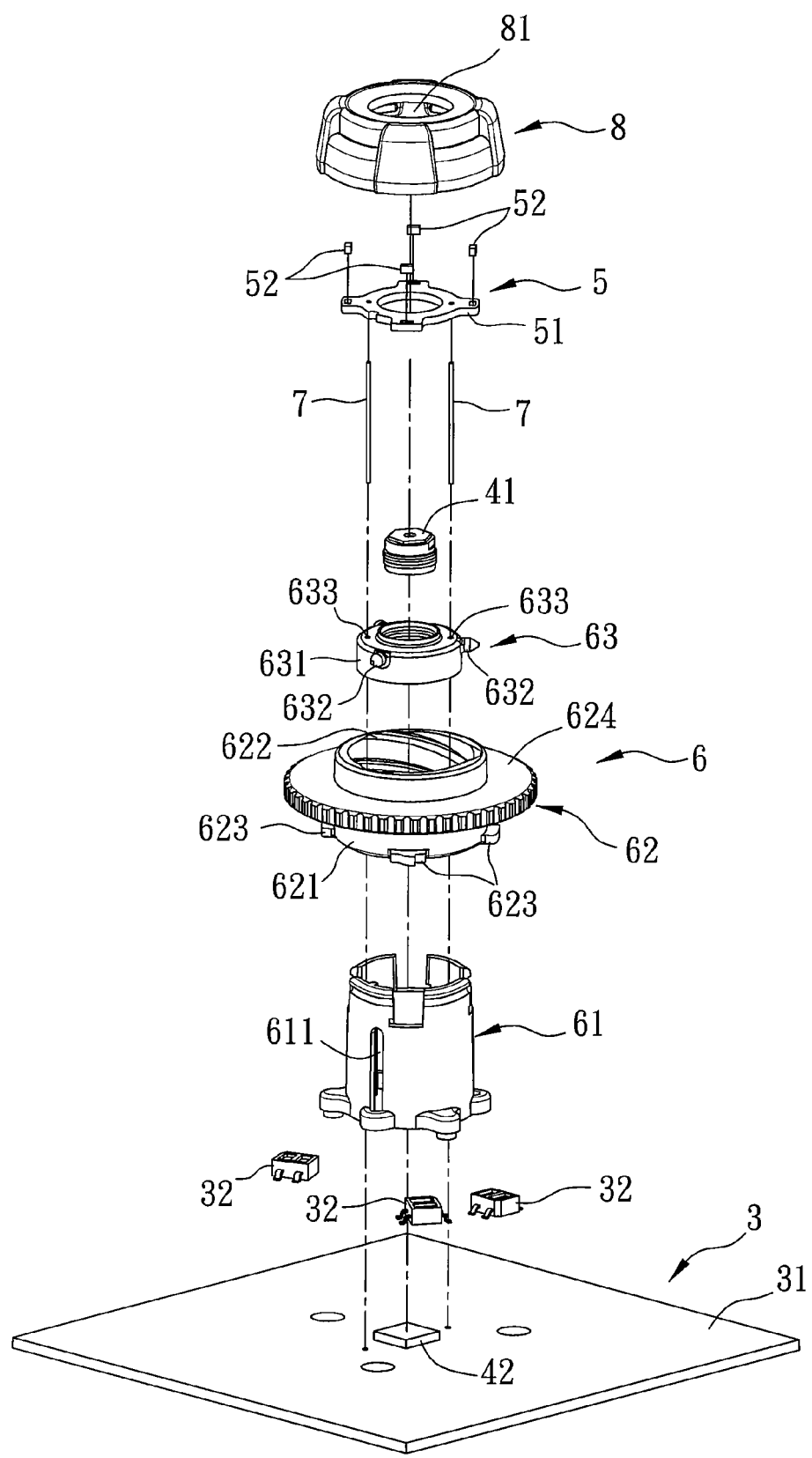
FIG. 5 is an exploded perspective view of the preferred embodiment of a lens device according to the present invention.
Figure 6:
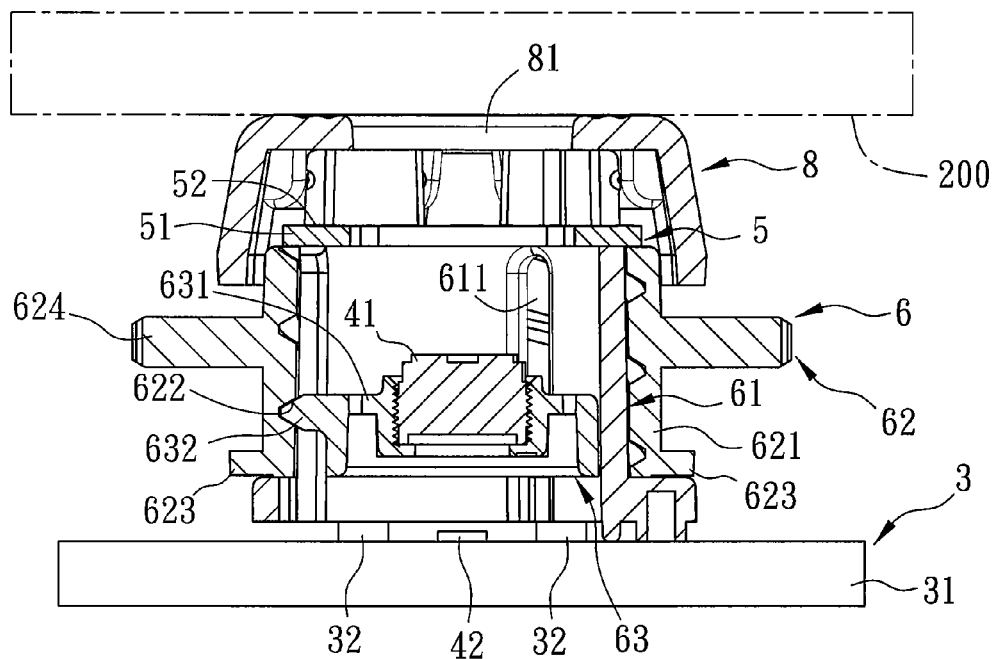
FIG. 6 is a cross-sectional view of the preferred embodiment in an assembled state.
Figure 7:
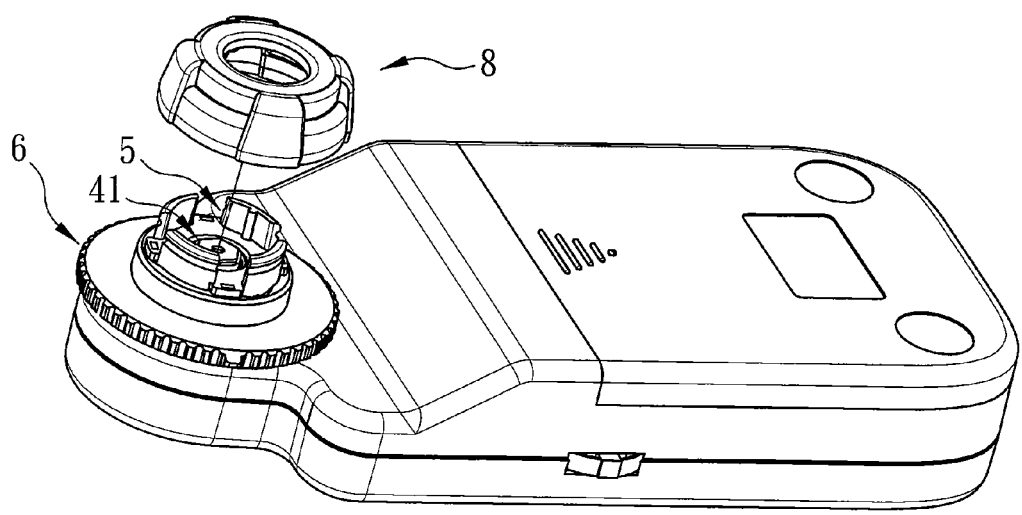
FIG. 7 is a partly exploded perspective view of the preferred embodiment to illustrate the lens device incorporated into a handle or a handheld unit.

Referring to FIGS. 5 to 7, the preferred embodiment of a lens device according to the present invention can be used for image magnification of a specimen 200. The lens device includes a control unit 3, a detecting unit, an objective lens 41, an image sensor 42, a light source 5, a tube assembly 6, a pair of conductors 7, and a light-transmissible cap 8.

The control unit 3 includes a main circuit board 31. The tube assembly 6 includes a guide barrel 61, an outer tube 62, and a lens holder 63. The guide barrel 61 is disposed on the main circuit board 31, confines a barrel hole that extends along a barrel axis, and is formed with a set of slots 611 (only one is visible in FIG. 5) that extend parallel to the barrel axis. The outer tube 62 includes a tube body 621 that is rotatably sleeved on the guide barrel 61 and that has an inner tube surface, a helical guiding portion 622 that is formed on the inner tube surface of the tube body 621, and an annular knob 624 that extends in radial outward directions from the tube body 621. In this embodiment, the annular knob 624 is designed in a gear shape for an easy grip and also for engagement to an external motor (not shown) if required. The lens holder 63 includes a holder body 631 that is disposed movably in the barrel hole of the guide barrel 61 and that has a set of projections 632 that extend through the slots 611 to engage the guiding portion 622. The image sensor 42 is disposed on and is electrically coupled to the main circuit board 31. The image sensor 42 is disposed in the guide barrel 61. The objective lens 41 is mounted to the lens holder 63 and is optically aligned with the image sensor 42. The light source 5 is coupled electrically to the main circuit board 31 and operable to output light for illumination.

In this embodiment, the detecting unit includes a set of angularly spaced apart shielding projections 623 provided on the outer tube 62, and a set of angularly spaced apart light sensors 32 disposed on the main circuit board 31 and shielded by the shielding projections 623 to an extent corresponding to the angular orientation of the outer tube 62. The light sensors 32 of the detecting unit generates a detector output indicating angular orientation of the outer tube 62 relative to the main circuit board 31. The light source 5 includes a light circuit board 51 electrically coupled to the main circuit board 31 and disposed on the guide barrel 61 of the tube assembly 6, and at least one light emitting unit 52 disposed on and electrically coupled to the light circuit board 51.

In this embodiment, there are four light emitting units 52 that are disposed on the light circuit board 51. The light emitting unit 52 can be a Light Emitting Diode (LED), a small light bulb, or any other light emitting element. The conductors 7 extend through through-holes 633 in the holder body 631 of the lens holder 31 and electrically couple the light circuit board 51 to the main circuit board 31. The conductors 7 can be a wire-type that intercommunicates the main circuit board 31 and the light circuit board 51. The light-transmissible cap 8 is sleeved on the tube body 621 of the outer tube 62 and is formed with an aperture 81 registered with the objective lens 41. The light-transmissible cap 8 is disposed to abut against the specimen 200 when it is desired to inspect the specimen 200.

In use, the annular knob 624 is rotated about the barrel axis such that rotation of the outer tube 62 relative to the guide barrel 61 results in the guiding portion 622 driving the projections 632 to result in movement of the lens holder 63 in the guide barrel 61 along the barrel axis, thereby adjusting a distance between the objective lens 41 and the specimen 200 in order to obtain a desirable image magnification of the specimen 200. At this time, the shielding projections 623 shield the light sensors 32 to an extent corresponding to the angular orientation of the outer tube 62 relative to the main circuit board 31, which corresponds to a distance between the objective lens 41 and the image sensor 42, so that the light sensors 32 generate the detector output. The control unit 3 is responsive to the detector output to control intensity of the light outputted by the light source 5 according to the angular orientation of the outer tube 62.

As mentioned hereinbefore, the higher the magnification power, the brighter will be the light required for optimum image viewing. Therefore, proper light balance is crucial for different magnification powers in order to obtain the best image quality of the specimen 200. Due to the variable light intensity output, invention is suitable for applications requiring higher magnification power.

Figure 8:
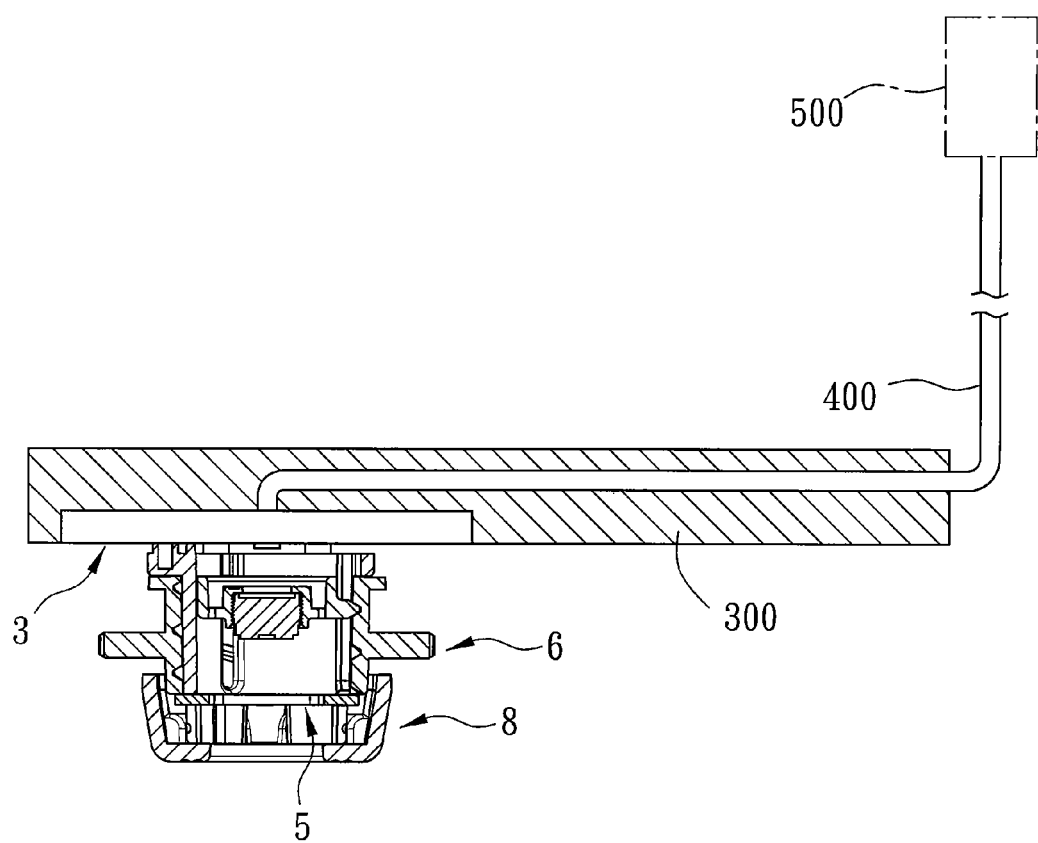
FIG. 8 is a sectional view of the preferred embodiment to illustrate the lens device coupled to an image viewer through a data cable.

In this embodiment, as shown in FIG. 8, the lens device further includes a handle 300 connected to the main circuit board 31, and a data cable 400 (USB cable) having one end electrically coupled to the main circuit board 31 and the other end electrically coupled to an image viewer 500 (i.e., a computer) for image viewing of the specimen 200. In some embodiments, the lens device can be incorporated into a handheld unit (see FIG. 7). Power supply to the main circuit board 31 can be regulated either by the image viewer 500 through electrical connection via the data cable 400, or by the handheld unit (batteries included).

In view of the above, the simple construction of the tube assembly 6, which comprises the guide barrel 61, the outer tube 62, and the lens holder 63, allow the lens device to achieve a specific magnification by retracting and extending the objective lens 41 relative to the specimen 200. Moreover, since rotation of the outer tube 62 results in driving the shielding projections 623 to shield the corresponding light sensors 32 for determining the angular orientation of the outer tube 62, the lens device is capable of controlling the intensity of the light outputted by the light emitting units 52 according to its current magnification setting. As a result, optimal image quality of the specimen 200 can be obtained from the lens device.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device for image magnification of a specimen, comprising:
   a control unit including a main circuit board;
   a tube assembly including
      a guide barrel disposed on said main circuit board, confining a barrel hole that extends along a barrel axis, and formed with a set of slots that extend parallel to the barrel axis,
      an outer tube including a tube body that is rotatably sleeved on said guide barrel and that has an inner tube surface, and a guiding portion that is formed on said inner tube surface of said tube body, and
      a lens holder including a holder body that is disposed movably in said barrel hole of said guide barrel and that has a set of projections that extend through said slots to engage said guiding portion, wherein rotation of said outer tube relative to said guide barrel results in said guiding portion driving said projections to result in movement of said lens holder in said guide barrel along the barrel axis;

an image sensor disposed on and electrically coupled to said main circuit board, said image sensor being disposed in said guide barrel;

an objective lens mounted to said lens holder and optically aligned with said image sensor;

a light source coupled electrically to said main circuit board and operable to output light for illumination; and a detecting unit coupled to said main circuit board and generating a detector output indicating angular orientation of said outer tube relative to said main circuit board;

said control unit being responsive to the detector output to control intensity of the light outputted by said light source according to the angular orientation of said outer tube.

2. The lens device as claimed in claim 1, wherein said detecting unit includes a set of angularly spaced apart shielding projections provided on said outer tube, and a set of angularly spaced apart light sensors disposed on said main circuit board and shielded by said shielding projections to an extent corresponding to the angular orientation of said outer tube, said light sensors generating the detector output.

3. The lens device as claimed in claim 1, wherein said light source includes a light circuit board electrically coupled to said main circuit board and disposed on said guide barrel of said tube assembly, and at least one light emitting unit disposed on and electrically coupled to said light circuit board.

4. The lens device as claimed in claim 3, further comprising a pair of conductors extending through said lens holder and electrically coupling said light circuit board to said main circuit board.

5. The lens device as claimed in claim 1, further comprising a light-transmissible cap sleeved on said tube body of said outer tube and formed with an aperture registered with said objective lens.

6. The lens device as claimed in claim 1, wherein said outer tube further includes an annular knob that extends in radial outward directions from said tube body.

7. The lens device as claimed in claim 1, further comprising a handle connected to said main circuit board, and a data cable having one end electrically coupled to said main circuit board.

* * * * *